(12) United States Patent
Keller

(10) Patent No.: US 11,540,575 B2
(45) Date of Patent: Jan. 3, 2023

(54) HAT WITH A CLOSABLE OPENING

(71) Applicant: Ponyback Inc., Plattsville (CA)

(72) Inventor: Stacey Keller, Plattsville (CA)

(73) Assignee: Ponyback Inc., Plattsville (CA)

( * ) Notice: Subject to any disclaimer, the term of this patent is extended or adjusted under 35 U.S.C. 154(b) by 176 days.

(21) Appl. No.: 16/899,120

(22) Filed: Jun. 11, 2020

(65) Prior Publication Data

US 2020/0390180 A1 Dec. 17, 2020

Related U.S. Application Data

(60) Provisional application No. 62/859,989, filed on Jun. 11, 2019.

(51) Int. Cl.
| | | |
|---|---|---|
| *A42B 1/22* | (2006.01) | |
| *G06Q 10/06* | (2012.01) | |
| *G06Q 10/08* | (2012.01) | |

(52) U.S. Cl.
CPC ......... *A42B 1/225* (2013.01); *G06Q 10/0633* (2013.01); *G06Q 10/0832* (2013.01); *G06Q 10/0833* (2013.01); *Y10T 24/32* (2015.01)

(58) Field of Classification Search
CPC ......... A42B 1/22; A42B 1/225; A42B 1/0175; Y10T 24/32
See application file for complete search history.

(56) References Cited

U.S. PATENT DOCUMENTS

| | | | | |
|---|---|---|---|---|
| 2,389,299 A | * | 11/1945 | Ellis | A41F 1/002 2/96 |
| 2,809,411 A | * | 10/1957 | Moghadam | A44B 19/04 24/303 |
| 2,897,511 A | * | 8/1959 | Blair | A42B 1/004 2/209.13 |
| 3,161,932 A | * | 12/1964 | Russell | A41F 1/002 24/303 |
| 3,827,019 A | * | 7/1974 | Serbu | A41F 1/002 335/285 |
| 3,919,743 A | * | 11/1975 | Cutler | A41F 1/002 24/303 |
| 4,399,595 A | * | 8/1983 | Yoon | A41F 1/002 24/303 |
| 5,604,960 A | * | 2/1997 | Good | A41F 1/002 24/303 |

(Continued)

FOREIGN PATENT DOCUMENTS

| | | |
|---|---|---|
| WO | 2005029985 A3 | 4/2005 |
| WO | 2020082159 A1 | 4/2020 |

*Primary Examiner* — Heather Mangine
(74) *Attorney, Agent, or Firm* — Bereskin & Parr LLP

(57) ABSTRACT

A headwear article is described herein. The headwear article includes a main body sized and shaped to receive at least a portion of a wearer's head. The main body includes a fastening mechanism having a pair of segments lining edges of a closable opening in the main body. Each segment of the fastening mechanism has a plurality of magnets and each of the plurality of magnets is configured to attract an opposite magnet located along an opposite edge of the opening to selectively close at least a portion of the opening around a bundle of hair when at least a portion of each of the segments of the fastening mechanism is beside and touching the other segment.

20 Claims, 12 Drawing Sheets

(56) References Cited

U.S. PATENT DOCUMENTS

| | | | | |
|---|---|---|---|---|
| 5,799,334 | A * | 9/1998 | Griffith | A42B 1/225 2/171 |
| 5,875,494 | A | 3/1999 | Garnier, Jr. et al. | |
| 5,933,872 | A | 8/1999 | Lema | |
| 6,301,754 | B1 * | 10/2001 | Grunberger | A41F 1/002 24/303 |
| 6,412,116 | B1 * | 7/2002 | Clark | A41F 1/002 2/129 |
| 7,178,185 | B1 * | 2/2007 | Nattier | A41D 15/04 2/84 |
| 8,695,193 | B2 * | 4/2014 | Kress | A47H 99/00 29/414 |
| 8,915,208 | B2 * | 12/2014 | Shanahan | G09F 21/04 116/173 |
| 9,572,386 | B1 * | 2/2017 | Scheer | A41F 1/002 |
| 11,147,331 | B1 * | 10/2021 | Rosario | A42B 1/22 |
| 2006/0006969 | A1 * | 1/2006 | Cassar | B23Q 3/1546 335/306 |
| 2006/0112523 | A1 * | 6/2006 | Deto | A44B 19/02 24/303 |
| 2007/0143906 | A1 * | 6/2007 | Renteria | A42B 1/0184 2/195.1 |
| 2007/0277353 | A1 * | 12/2007 | Kondo | A41F 1/002 24/403 |
| 2008/0092272 | A1 * | 4/2008 | Vainio | A42B 1/225 2/209.7 |
| 2008/0282517 | A1 * | 11/2008 | Claro | A42B 1/22 24/303 |
| 2009/0178245 | A1 * | 7/2009 | Albert | A41F 1/002 24/303 |
| 2011/0173739 | A1 | 7/2011 | Riesen et al. | |
| 2013/0061431 | A1 * | 3/2013 | Naftali | A45C 13/1069 24/303 |
| 2014/0082826 | A1 * | 3/2014 | Kuthari | A42B 1/225 2/171.7 |
| 2014/0130235 | A1 * | 5/2014 | Johnson | A42B 1/206 2/209.3 |
| 2014/0223637 | A1 * | 8/2014 | Belle, Jr. | A42B 1/0181 2/195.1 |
| 2016/0366966 | A1 * | 12/2016 | Sunness | A42B 1/02 |
| 2017/0196280 | A1 * | 7/2017 | Murphy | A42B 1/046 |
| 2019/0037951 | A1 * | 2/2019 | Rue | A42B 1/225 |
| 2019/0075869 | A1 * | 3/2019 | Smith, IV | A45C 3/00 |
| 2019/0082763 | A1 * | 3/2019 | Seela | A42B 1/24 |
| 2019/0174856 | A1 * | 6/2019 | Bowles | A42B 1/244 |
| 2019/0239587 | A1 * | 8/2019 | Klein-Kassab | A44B 19/267 |
| 2019/0365006 | A1 * | 12/2019 | Lim | A42B 1/225 |
| 2020/0159039 | A1 * | 5/2020 | Masters | G02C 5/143 |
| 2020/0297057 | A1 * | 9/2020 | Davis | A42B 1/004 |
| 2021/0100308 | A1 * | 4/2021 | Smith | A42B 1/205 |
| 2021/0251326 | A1 * | 8/2021 | Smith, III | A42B 1/02 |
| 2021/0315291 | A1 * | 10/2021 | Votolato | A41D 13/1161 |
| 2021/0321707 | A1 * | 10/2021 | Lord | A42B 1/225 |
| 2021/0337907 | A1 * | 11/2021 | Bowman | A42B 1/04 |
| 2021/0368886 | A1 * | 12/2021 | Swart | A42B 3/225 |

* cited by examiner

HAT WITH A CLOSABLE OPENING

CROSS-REFERENCE

This application claims priority to and the benefit of U.S. Provisional Patent Application No. 62/859,989 entitled "Hat with a Closable Opening", filed on Jun. 11, 2019, the entirety of which is incorporated herein by reference.

TECHNICAL FIELD

Headwear articles are described herein, more particularly headwear articles with a closable opening are described herein.

BACKGROUND

Men and women with long hair who like to wear their hair pulled up into a bundle (e.g. a ponytail and/or a bun) often have a preferred position (e.g. height and/or location) on their head for their bundle. The position of the bundle as well as the size and/or shape of the bundle may vary from person to person. When wearing a hat, the wearer is often unable to wear their hair in a bundle at their preferred position as the bundle protrudes from the wearer's head and does not fit between the hat and the scalp of the wearer.

Many different technologies have been developed to address this problem.

For instance, as referenced in U.S. Pat. No. 5,875,494A by Winslow et al, one potential solution provides for the passage of hair through an opening in a hat using clasps and overlapping portions of fabric.

Another potential solution, as referenced in US20110173739A1 by Riesen et al, provides for the passage of hair through an opening in a hat and attempts to conceal the opening by use of an invisible zipper.

Another potential solution, as referenced in US20140082826A1 by Kuthari, provides a closable opening in a hat by use of a fastener mechanism, which is clearly seen from the outside of the headwear.

Another potential solution, as referenced in WO2005029985A2 by Tufano-Sisca, provides a permanent opening in a hat for hair passage, with an adjustable closer fastening system using Velcro.

Another potential solution, as referenced in U.S. Pat. No. 5,933,872A by Lema, provides a permanent opening in a hat for hair passage, with a specific immovable opening location.

Currently hats with openings for bundles of hair generally do not accommodate multiple bundles of hair and do not provide a flexible opening to accommodate various shapes and sizes, and locations of hair passage. Further, the openings of these hats are typically easily viewable and not concealed when not in use.

Accordingly, there is a need for new headwear with a closable opening that provides for the passage of hair therethrough and are concealed when not in use.

SUMMARY

In accordance with a broad aspect, a headwear article is described herein. The headwear article includes a main body sized and shaped to receive at least a portion of a wearer's head. The main body includes a fastening mechanism having a pair of segments lining edges of a closable opening in the main body, each segment of the fastening mechanism having a plurality of magnets. Each of the plurality of magnets is configured to attract an opposite magnet located along an opposite edge of the opening to selectively close at least a portion of the opening around a bundle of hair when at least a portion of each of the segments of the fastening mechanism are beside and touching each other.

In some embodiments, each of the segments of the fastening mechanism are concealed within the main body.

In some embodiments, each of the plurality of magnets is held in place within a seam allowance of the main body.

In some embodiments, the fastening mechanism includes at least two pairs of corresponding magnets, each magnet of each pair of corresponding magnets being positioned on opposed edges of the opening and being vertically aligned with an other magnet of the pair of corresponding magnets to reversibly couple the fastening mechanism and close at least a portion of the opening.

In some embodiments, at least one of the plurality of magnets is generally cylindrical in shape.

In some embodiments, at least one pair of magnets of the plurality of magnets is diametrically magnetized.

In some embodiments, each of the plurality of magnets is diametrically magnetized.

In some embodiments, a first magnet of the plurality of magnets is located along a first segment of the fastening mechanism and has a side surface having a selected polarity; a second magnet of the plurality of magnets is located along a second segment of the fastening mechanism and has a side surface having a selected polarity that is opposite the selected polarity of the side surface of the first magnet; and the first and second magnets are each located at substantially similar positions along the segments of the fastening mechanism.

In some embodiments, a third magnet of the plurality of magnets is located along the first segment of the fastening mechanism spaced apart from the first magnet, the third magnet having a side surface having a selected polarity similar to the selected polarity of the first magnet.

In some embodiments, a first magnet of the plurality of magnets is located along a first segment of the fastening mechanism; a second magnet of the plurality of magnets is located along the first segment of the fastening mechanism and is spaced apart from the first magnet; and the headwear article further comprises a filler material positioned between the first magnet and the second magnet along the first segment of the fastening mechanism to provide flexibility to the fastening mechanism.

In some embodiments, at least one of the plurality of magnets is positioned between two fragments of the filler material.

In some embodiments, the headwear article further comprises a third magnet located along a second segment of the fastening mechanism, the third magnet and the first magnet being located at substantially similar positions along the segments of the fastening mechanism and each being positioned between two fragments of the filler material.

In some embodiments, the filler material is a polymer-based filler material.

In some embodiments, a first segment of the fastening mechanism is in side-by-side juxtaposition with a second segment of the fastening mechanism when at least a portion of the opening is closed.

In some embodiments, the opening has a width of about 10 cm.

In some embodiments, the opening extends from a top button of the main body to a bottom seam allowance of the main body.

In some embodiments, each segment of the fastening mechanism includes six magnets.

In some embodiments, each segment of the fastening mechanism includes a housing and each of the plurality of magnets is located within one of the housings.

In some embodiments, each of the plurality of magnets are held in place along the edges of the opening within a seam allowance.

In accordance with a broad aspect, a headwear article is described herein. The headwear article includes a main body sized and shaped to receive at least a portion of a wearer's head. The main body includes a plurality of panels, each panel coupled to another panel along a seam. The main body also includes a fastening mechanism having a pair of segments lining edges of a closable opening in the main body. Each segment of the fastening mechanism is positioned within a seam allowance of a panel of the main body and each seam allowance is positioned along an edge of the opening. Each segment of the fastening mechanism includes a plurality of magnets configured to attract an opposite magnet located along an opposite edge of the opening to provide for the fastening mechanism to selectively close at least a portion of the opening when at least a portion of each of the segments of the fastening mechanism are beside and touching each other.

These and other features and advantages of the present application will become apparent from the following detailed description taken together with the accompanying drawings. However, it should be understood that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and which are now described. The drawings are not intended to limit the scope of the teachings described herein.

Figure 1:
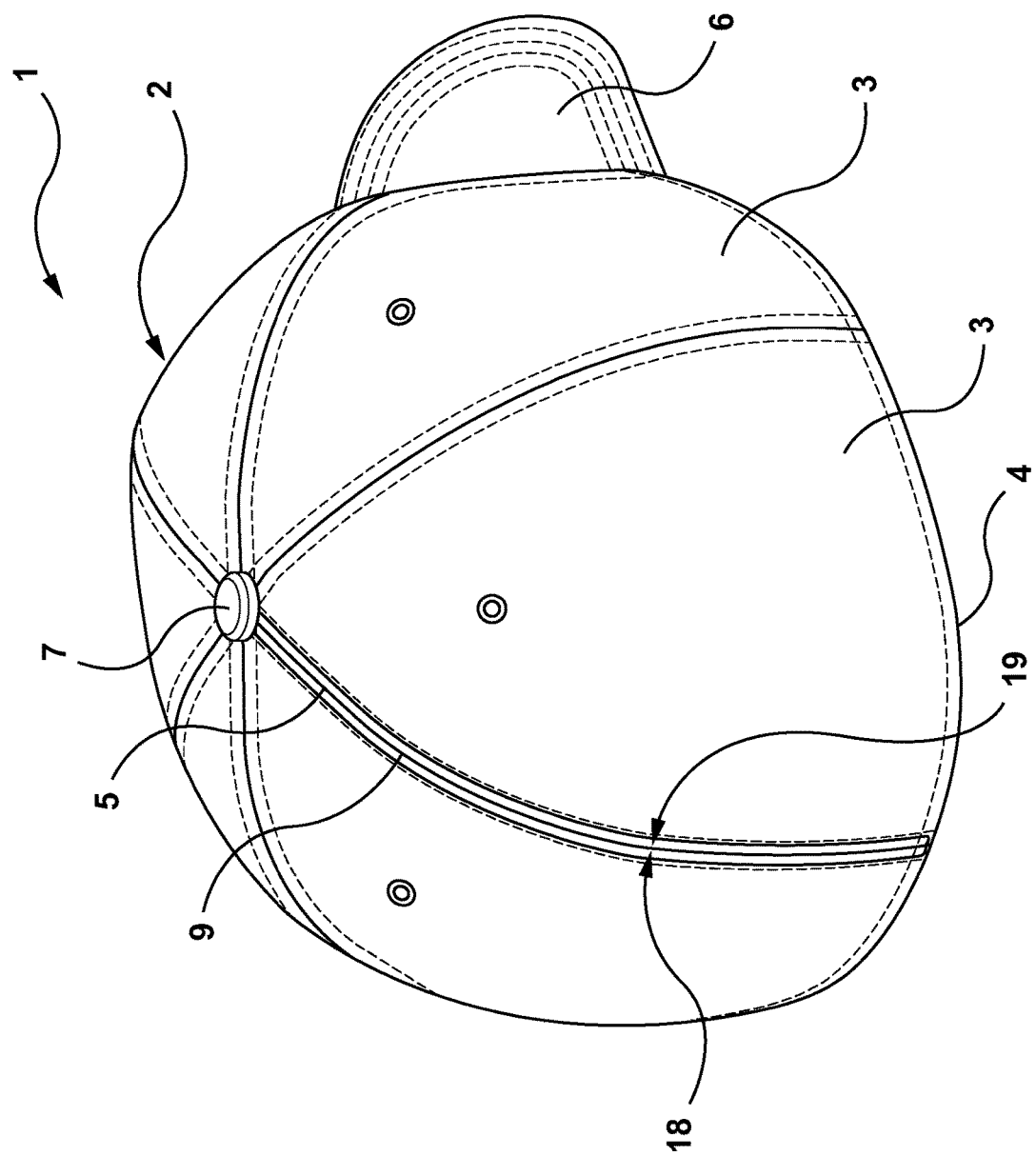
FIG. 1 shows a rear perspective view of an example embodiment of a headwear article with a closable opening in a closed orientation.
Figure 2:
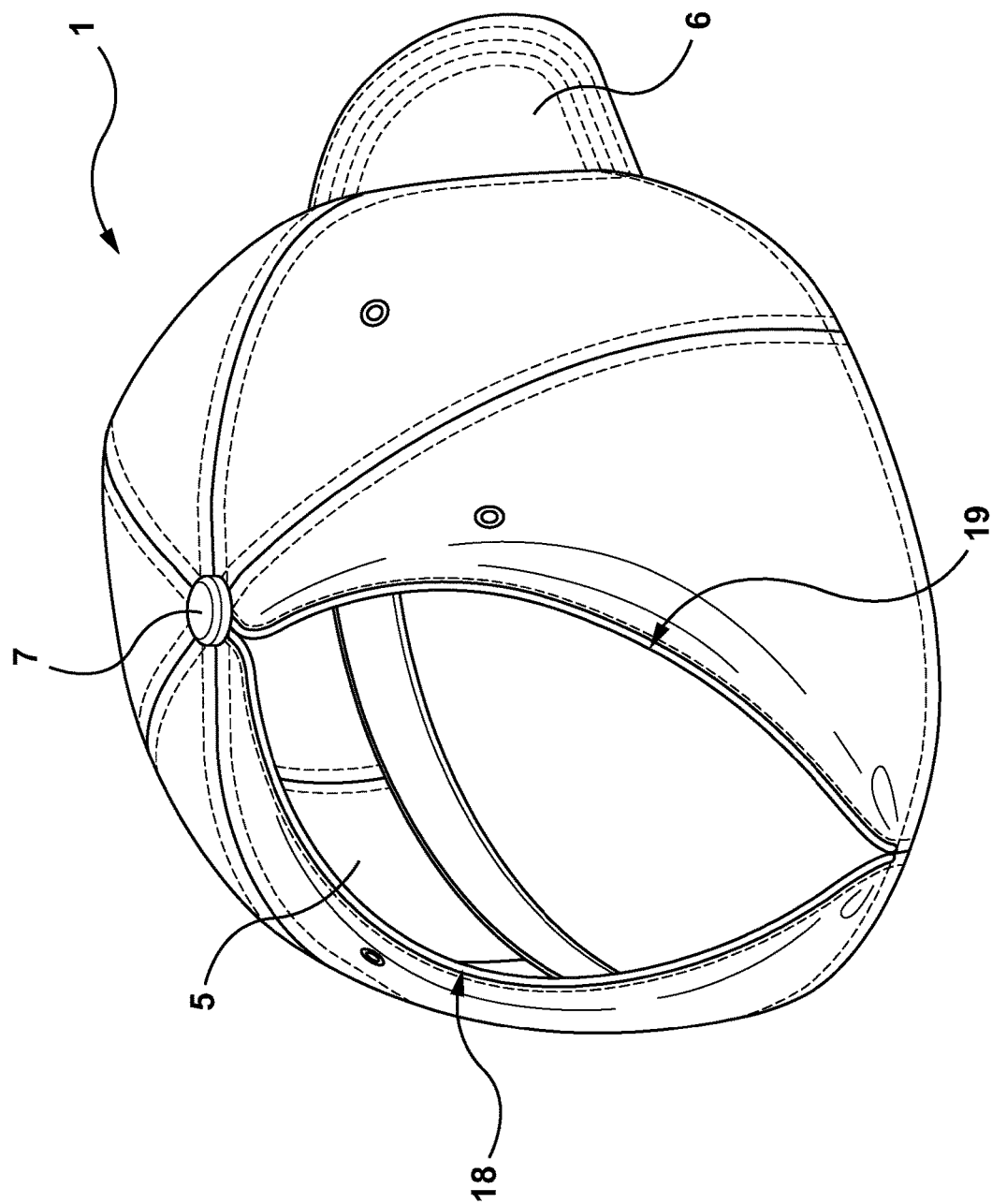
FIG. 2 shows a rear perspective view of the headwear article of FIG. 1 with the closable opening in an open orientation.
Figure 3:
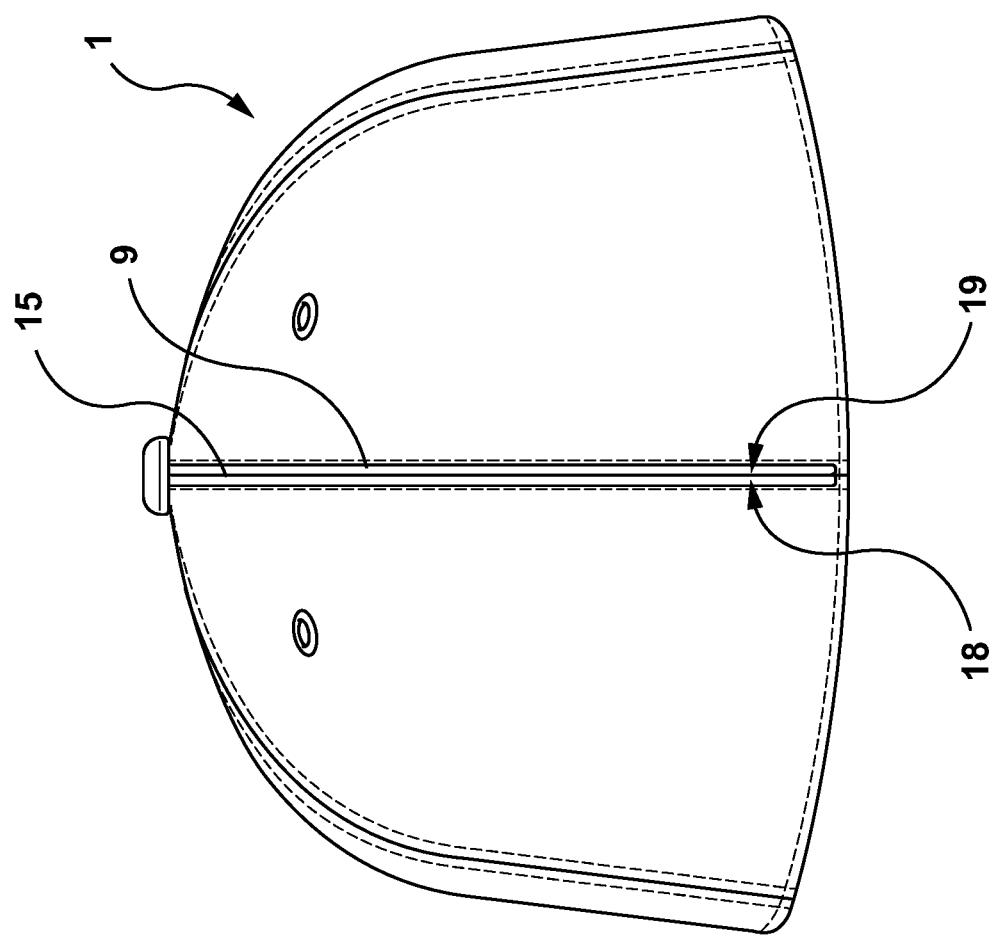
FIG. 3 shows a rear view of the headwear article of FIG. 1 with the closable opening in the closed orientation.
Figure 4:
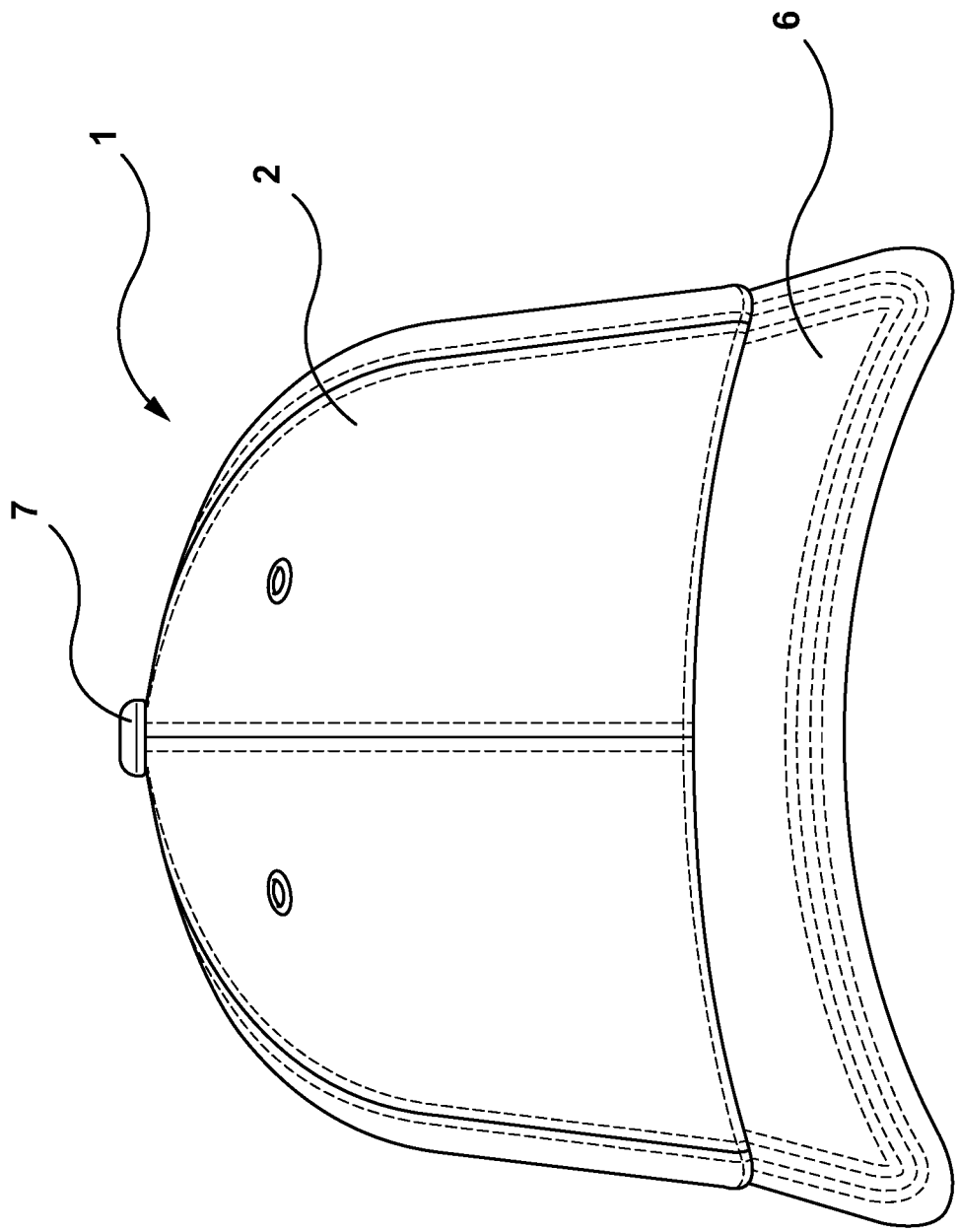
FIG. 4 shows a front view of the headwear article of FIG. 1 with the closable opening in the closed orientation.

The skilled person in the art will understand that the drawings, further described below, are for illustration purposes only. The drawings are not intended to limit the scope of the applicant's teachings in any way. Also, it will be appreciated that for simplicity and clarity of illustration, elements shown in the figures have not necessarily been drawn to scale. For example, the dimensions of some of the elements may be exaggerated relative to other elements for clarity. Further aspects and features of the example embodiments described herein will appear from the following description taken together with the accompanying drawings.

DESCRIPTION OF EXAMPLE EMBODIMENTS

Various articles and methods are described below to provide an example of at least one embodiment of the claimed subject matter. No embodiment described below limits any claimed subject matter and any claimed subject matter may cover articles and methods that differ from those described below. The claimed subject matter is not limited to articles and methods having all of the features of any one article and method described below or to features common to multiple or all of the articles and methods described below. Subject matter that may be claimed may reside in any combination or sub-combination of the elements or process steps disclosed in any part of this document including its claims and figures. Accordingly, it will be appreciated by a person skilled in the art that an article or method disclosed in accordance with the teachings herein may embody any one or more of the features contained herein and that the features may be used in any particular combination or sub-combination that is physically feasible and realizable for its intended purpose.

Furthermore, it is possible that an article or method described below is not an embodiment of any claimed subject matter. Any subject matter that is disclosed in an article or method described herein that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

It will also be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

It should be noted that terms of degree such as "substantially", "about" and "approximately" as used herein mean a reasonable amount of deviation of the modified term such that the result is not significantly changed. These terms of degree should be construed as including a deviation of the modified term, such as 1%, 2%, 5%, or 10%, for example, if this deviation would not negate the meaning of the term it modifies.

Furthermore, the recitation of any numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation up to a certain amount of the number to which reference is being made, such as 1%, 2%, 5%, or 10%, for example, if the end result is not significantly changed.

It should also be noted that, as used herein, the wording "and/or" is intended to represent an inclusive -or. That is, "X and/or Y" is intended to mean X or Y or both, for example. As a further example, "X, Y, and/or Z" is intended to mean X or Y or Z or any combination thereof.

In spite of the technologies that have been developed, there remains a need in the field for improvements in the development of headwear articles with openings that provide for bundles of hair to pass therethrough. Further, without limiting the foregoing, there is a need for headwear articles that provide a discreetly hidden (e.g. concealed) opening so the headwear article can conceal a wearer's head when a bundle of hair does not pass through the headwear article. There is also a need for a headwear article that provide for the opening to be concealed in a unobtrusive manner so that a person viewing the headwear article when the closable opening is closed do not see that headwear article includes a closable opening.

The headwear articles described herein include a closable opening to provide for the passage of at least on bundle of hair therethrough. The headwear articles described herein include one or more fastening mechanisms that provide the headwear articles with at least one closable opening in a main body of the headwear article. The fastening mechanism includes two or more magnets disposed along (e.g. lining) each of two opposed edges of the closable opening in a main body of the headwear article. Each of the magnets is generally concealed within the main body of the headwear article. In at least one embodiment, each of the magnets may also be held in place within a seam allowance of a panel of the main body. The fastening mechanism generally provides for closure of the closable opening in the headwear article around at least one bundle of hair passing through any position within the opening. In at least one embodiment, the fastening mechanism provides for the closable opening to accommodate (e.g. snuggly fit) around various sizes of hair bundles and more than one hair bundle. Each of the plurality of magnets of the headwear article is configured to attract an opposite magnet located along an opposite edge of the opening to selectively close at least a portion of the opening around a bundle of hair when at least a portion of each of the segments of the fastening mechanism are beside and touching each other.

Turning to the Figures, FIG. 1 shows a rear perspective view of a headwear article 1 with a main body 2 having a closable opening 5 in a closed orientation. Although the headwear article 1 shown in each of the figures may be referred to as a baseball hat with a brim, bill or visor, it should be understood that headwear article 1 is not limited to being a baseball hat and can take any number of other different forms, such as but not limited to a knit hat (e.g. a tuque), a beanie, a beret, a cowboy hat, a sun hat, a floppy hat, a fedora, a cloche hat, a flat cap, or the like.

Headwear article 1 shown in FIG. 1 has a main body 2 and a bill 6 extending outwardly from the main body 2. Main body 2 may include a plurality of panels of material 3 that are joined together (e.g. stitched) to form one or more seams 15 that define the main body 2. For instance, headwear article 1 may include six panels joined together by six seams 15. In the embodiment shown in FIG. 1, the main body 2 includes six triangular shaped panels 3 stitched or otherwise attached together (e.g. at seams 15), the tips of the panels meeting at the top of the cap portion 7 at a button or Squatchee, and the panels 3 extend radially and downwardly to define a lowermost edge 4 of the main body 2.

Seams 15 extend between (e.g. vertically) top portion 7 (e.g. a button or Squatchee) of the main body 2 and a lowermost edge 4 of the main body 2. In at least one embodiment, seams 15 extend vertically from about top portion 7 to about lowermost edge 4 (e.g. to a bottom seam allowance of the main body). In at least one embodiment, seams 15 may extend horizontally around at least a portion of the main body 2 between top portion 7 and the lowermost edge 4. Herein, the tem "seam" refers to a line along which at least two pieces of fabric, or at least two portions of one piece of fabric, are joined together. For example, a seam may be formed by sewing, or at least attaching, together at least two pieces of fabric, or sewing together two or more portions of one piece of fabric. In another example, a seam may also be formed by reversibly coupling at least two pieces of fabric, or reversibly coupling two or more portions of one piece of fabric.

In at least one embodiment, such as the embodiments shown in FIGS. 1-11 herein, the top portion 7 of the main body 2 is a button or Squatchee 7 and the seams 15 extend between the button 7 and lowermost edge 4 of the main body 2. In at least one embodiment, the seams 15 may extend between button 7 and an uppermost edge of a band (not shown) forming a lower portion of the main body 2. Generally, the seams 15 may extend between any portion of the main body 2 lower than a top portion thereof (e.g. button or Squatchee 7) and any portion of the main body 2 above the lowermost edge 4 or to the lowermost edge 4.

Figure 8:
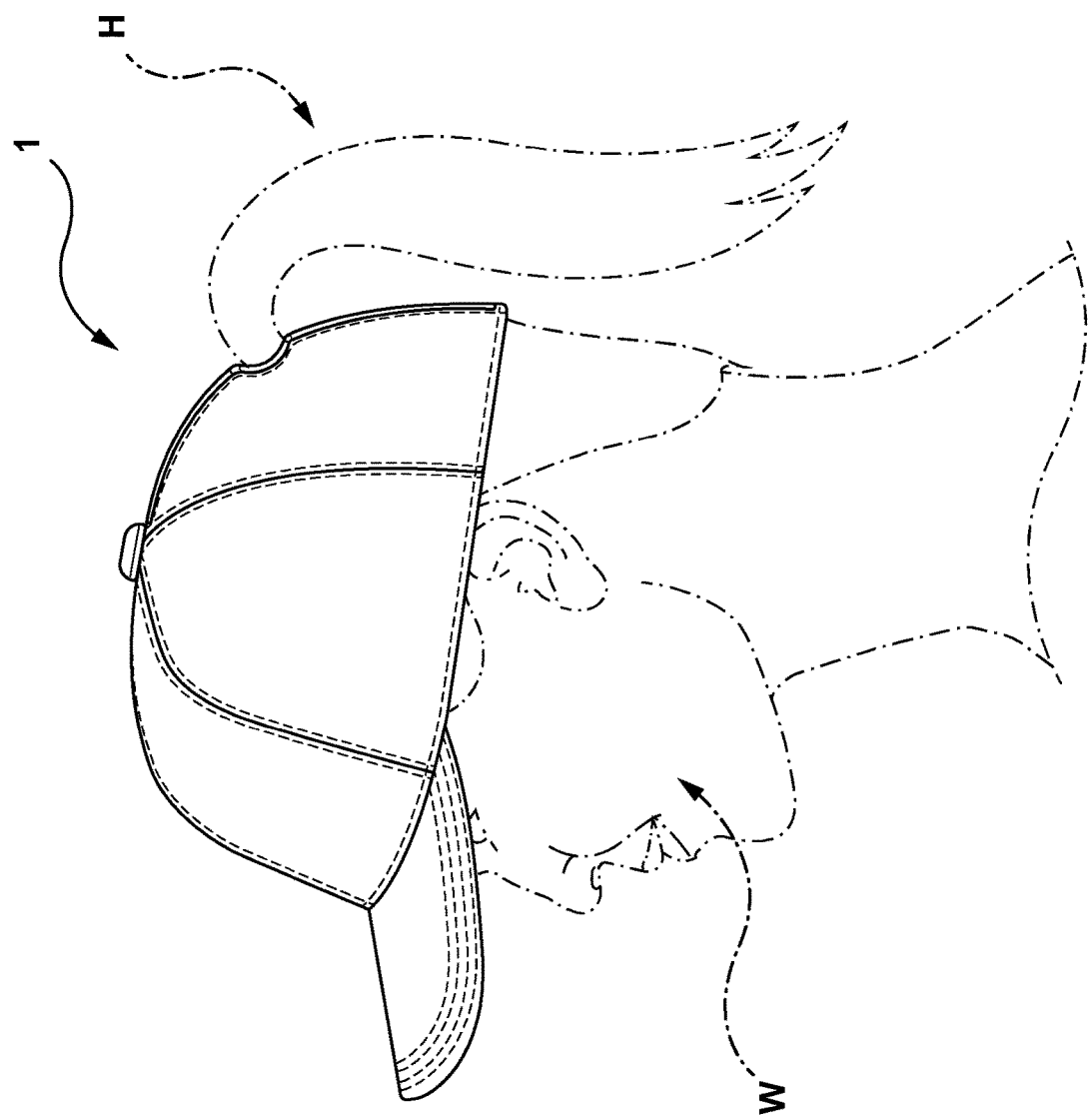
FIG. 8 shows a side view of the headwear article of FIG. 1 with the closable opening in the closed orientation around the hair bundle when the headwear article is worn by a person.

Closable opening 5 (see for example FIGS. 2, 5 and 8) may be positioned anywhere within the main body 2 to provide for passage of at least one bundle of hair H therethrough (see FIG. 8). Closable opening 5 is formed in a select, predetermined area of the main body 2. The dimensions and position of the closable opening 5 can vary depending on the application of the headwear article 1. For instance, in at least one embodiment, closable opening 5 may be defined by two opposed seam allowances that form a seam 15 when they are side-by-side or abutting and the main body 2 has a closed orientation and a re spaced apart from one another (at least partially) when the main body 2 has an open orientation.

Headwear article 1 includes a fastening mechanism 9. In the embodiment shown in the drawings, fastening mechanism 9 includes a pair of segments that form a rearward-most seam 15 that extends vertically between top portion 7 of the main body 2 and lowermost edge 4 of the main body 2 when the segments of the fastening mechanism are beside and touching each other. Herein, the segments of the fastening mechanism 9 are considered to be touching each other for instance and not limited to when the segments are positioned within a seam allowance of the main body 2 and the fabric forming the seam allowances are touching each other.

Figure 5:
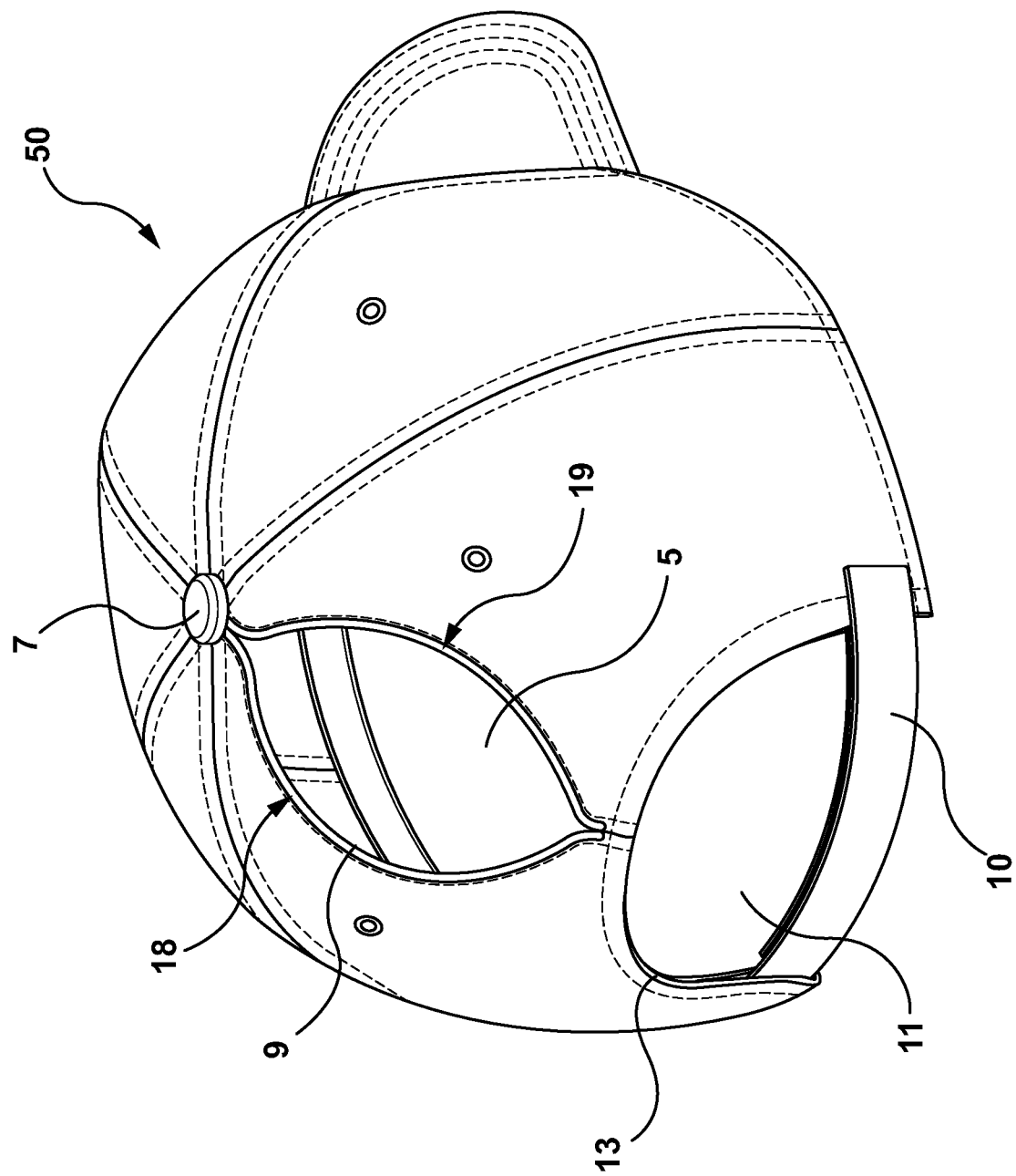
FIG. 5 shows a rear perspective view of another example embodiment of a headwear article with a closable opening in an open orientation.
Figure 6:
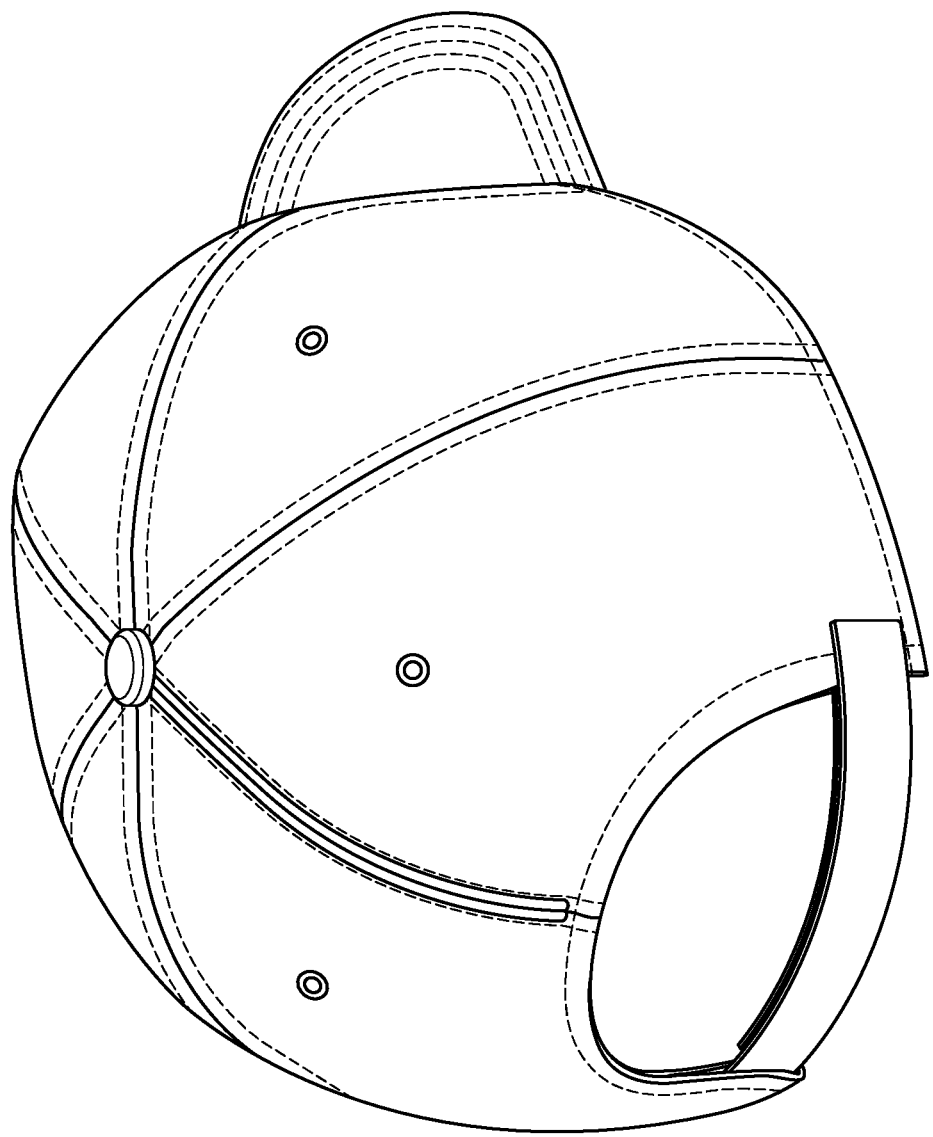
FIG. 6 shows a rear perspective view of the headwear article of FIG. 5 with the closable opening in a closed orientation.
Figure 7:
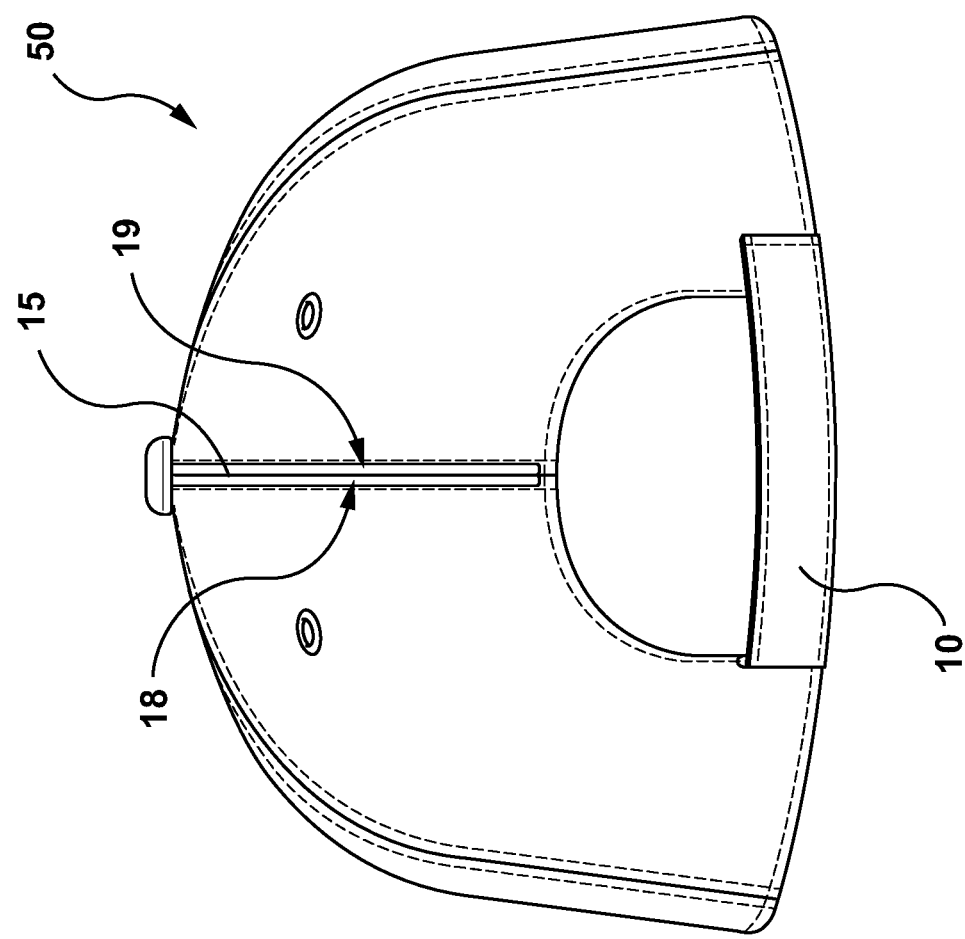
FIG. 7 shows a rear view of the headwear article of FIG. 5 with the closable opening in the closed orientation.

FIGS. 5 to 7 shown another embodiment of a headwear article. Headwear article 50 has a main body 2 and a closable opening 5 in the main body 2 defined by two opposed seam allowances that form a seam 15 when they are side-by-side or abutting. In this embodiment, headwear article 50 includes a fastening mechanism 9 that, together with the two opposed seam allowances, forms a rearward-most seam 15 that extends vertically between top portion 7 of the main body 2 and an uppermost edge 13 of a rear opening 11 in the main body 2. Rear opening 11 of the headwear article 50 generally provides for a diameter of the main body 2 to be adjustable (e.g. via adjustment structure 10).

Fastening mechanism 9 may be partially or completely concealed from a view of an observer looking at an outer surface of the headwear article 1. Further, fastening mechanism 9 is configured to provide for the closable opening 5 to be concealed in a unobtrusive manner so that a person viewing the headwear article 1 when the closable opening 5 is closed such that a person looking at the headwear article 5 when the closable opening 5 is closed does not see that the headwear article 1 includes a closable opening 5.

In the embodiments shown in the Figures herein, fastening mechanism 9 includes a pair of segments 28 that each line longitudinal edges of the closable opening 5. Each of the segments 28 of fastening mechanism 5 is at least partially concealed within a first seam allowance 18 and a second seam allowance 19 of the rearward-most seam 15 (see FIGS. 2 and 3) positioned on opposed sides of the closable opening 5. In this manner, rearward-most seam 15 may be referred to as a false seam. Herein, it should be understood that the term "seam allowance", which can also be referred to as an inlay, refers to the area between a fabric edge and a stitching line on two (or more) pieces of material being sewn together.

In at least one embodiment, fastening mechanism 9 includes a pair of segments 28, and each of the segments 28 include a plurality of magnets 21. In at least one embodiment, one segment 28 is disposed along first seam allowance 18 and the other segment 28 is disposed along the second seam allowance 19 to provide for the fastening mechanism 9 to close at least a portion of the closable opening 5. In at least one embodiment, one segment 28 is positioned within first seam allowance 18 and the other segment 28 is positioned within the second seam allowance 19 to provide for the fastening mechanism 9 to close at least a portion of the closable opening 5.

Figure 10:
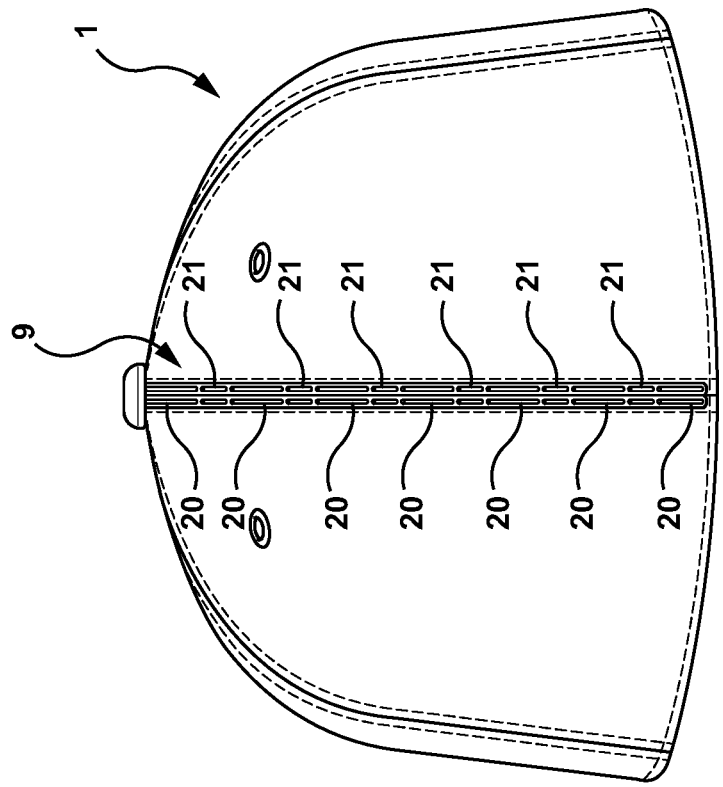
FIG. 10 shows a rear of the fastening mechanism of FIG. 9 in a closed orientation.
Figure 9:
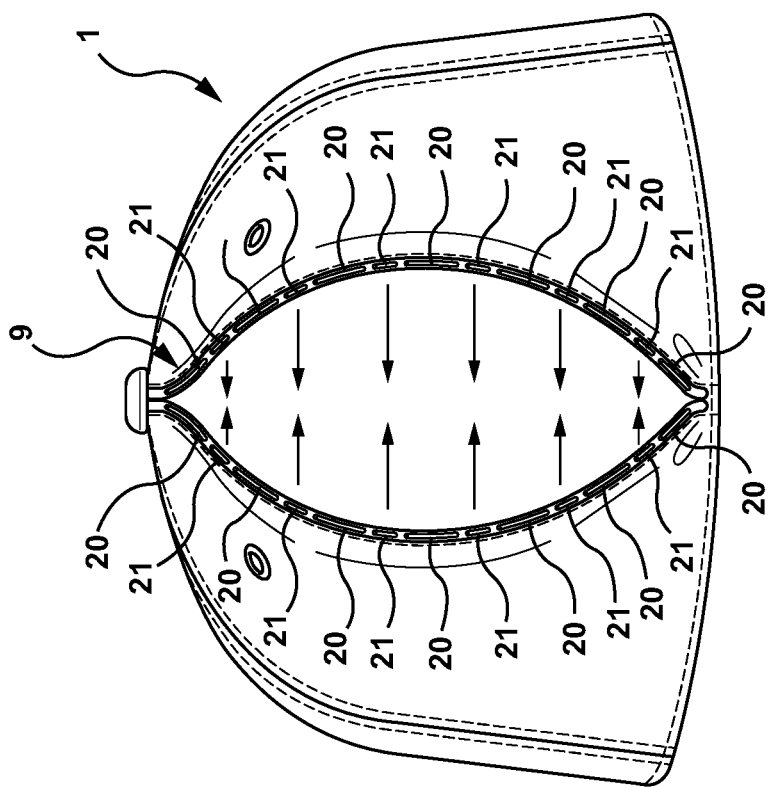
FIG. 9 shows a perspective of an example embodiment of a fastening mechanism for a headwear article in an open orientation.

FIGS. 9 and 10 show one embodiment of a fastening mechanism 9 in an open configuration and a closed configuration, respectively. In at least one embodiment, each magnet 21 of the first seam allowance 18 is aligned (e.g. vertically) with a corresponding magnet of the second seam allowance 19 to form a pair of corresponding magnets. Each magnet 21 of the first seam allowance 18 is configured to fasten to (e.g. reversibly couple with) its corresponding magnet of the second seam allowance 19 and, similarly, each magnet 21 of the second seam allowance 19 is configured to fasten to (e.g. reversibly couple with) its corresponding magnet of the first seam allowance 18. In these embodiments, each pair of corresponding magnets are positioned directly across from each other in opposition of each other to provide a magnetic force between the corresponding magnets to securely close (e.g. fasten) the closable opening 5.

Each of the plurality of magnets 21 is configured to attract an opposite magnet 21 located along an opposite edge of the opening 5 to selectively close at least a portion of the opening 5 around a bundle of hair when at least a portion of each of the segments 28 of the fastening mechanism 9 are beside and touching each other.

In at least one embodiment, each magnet 21 of the first seam allowance 18 is also spaced from at least one other respective magnet 21 of the first seam allowance 18 along first seam allowance 18. Similarly, each magnet 21 of the second seam allowance 19 is spaced from at least one other respective magnet 21 of the second seam allowance 19. In at least one embodiment, the plurality of magnets 21 are dispersed along a length of a segment 28 of the fastening mechanism 9. In at least one embodiment, the magnets 21 are evenly dispersed (e.g. equally spaced from each other) along the length of a segment 28 of the fastening mechanism 9. In at least one embodiment, the magnets 21 are unevenly dispersed (e.g. unequally spaced from each other) along the length of a segment 28 of the fastening mechanism 9. In at least one embodiment, two or more magnets 21 can be placed directly adjacent to one another to form a group of magnets 21 and two or more groups of magnets 21 can be evenly dispersed or unevenly dispersed along the length of a segment 28 of the fastening mechanism 9.

In at least one embodiment, each of the magnets 21 is held in place within a seam allowance of the main body 2.

Fastening mechanism 9 has at least three different orientations: a closed orientation (see, for example, FIG. 1) where the segments of 28 of the fastening mechanism 9 are in side-by-side juxtaposition (e.g. abutting or touching) with each other and the opening 5 is closed (e.g. fastening mechanism 9 does not provide an opening for a bundle of hair to pass through the main body 2); an open orientation (see, for example, FIG. 2) where the where the segments of 28 of the fastening mechanism 9 are spaced apart from each other and fastening mechanism 9 does not close any portion of the closable opening 5; and a partially closed orientation (see, for example, FIG. 8) where at least a portion of the segments of 28 of the fastening mechanism 9 are in side-by-side juxtaposition with each other (e.g. abutting or touching) and the a portion of the closable opening 5 is closed (e.g. fastening mechanism 9 provides an opening for a bundle of hair to pass through the main body 2, but the opening has a smaller surface area than the opening present in the open orientation).

When fastening mechanism 9 is in its open orientation or partially closed orientation, at least one bundle of hair H of the wearer W may pass through the closable opening 5. In this manner, the bundle of hair H passing through the closable opening 5 contacts material of the main body 2 forming the outer surface of the first 18 and second 19 seam allowances. After the bundle of hair H is passed through the closable opening 5, at least two pairs of magnets 21 of the fastening mechanism 9 can be brought together to close a portion of the closable opening around the bundle of hair H (see FIG. 8) to create a tight fit around the bundle of hair H.

In some embodiments, the fastening mechanism 9 may include two magnets 21 in each of the first seam allowance 18 and the second seam allowance 19. In this embodiment, each of the magnets 21 is spaced from a respective magnet 21 in a same seam allowance and is aligned with (e.g. vertically) a corresponding magnet 21 of the other seam allowance to couple with the other magnet 21 of the other seam allowance to close at least a portion of the closable opening 5. When the headwear article of this embodiment is used with a bundle of hair H, the bundle of hair H passes through the portion of the closable opening 5 in the spacing between the respective magnets 21 in a same seam allowance. The corresponding magnets 21 of opposed seam allowances couple with the other above and below the bundle of hair H to close at least a portion of the closable opening 5.

In some embodiments, the fastening mechanism 9 includes more than two magnets 21 dispersed along each of the first seam allowance 18 and the second seam allowance 19. Again, in these embodiments, each of the magnets 21 is spaced from a respective magnet 21 in a same seam allowance and is aligned with (e.g. vertically) a corresponding magnet 21 of the other seam allowance to couple with the other magnet 21 of the other seam allowance to close at least a portion of the closable opening 5. When the headwear article 1 of this embodiment is used with a bundle of hair H, the bundle of hair H may pass through any portion of the closable opening 5 between an uppermost magnet 21 of the plurality of magnets and a lowermost magnet 21 of the plurality of magnets. Corresponding magnets 21 above an uppermost boundary of the bundle of hair H and below a lowermost boundary of the bundle of hair H may be brought together to removably couple to each other to partially close the closable opening 5 around the bundle of hair H.

In some embodiments, at least one of the plurality of magnets 21 is generally cylindrical in shape. In at least one embodiment, each of the plurality of magnets is cylindrical in shape. In at least one embodiment, one pair of magnets of the plurality of magnets 21 is diametrically magnetized. In at least one embodiment, each of the plurality of magnets 21 is diametrically magnetized. The polarity of each of the magnets 21 is selected such that each of the pairs of magnets are specifically attracted to one another. The selection of magnet polarity may be better understood with reference to FIGS. 9 and 10.

As may be seen in FIG. 9, a side surface of magnet 21 has been selected to have a first polarity (e.g. a north pole polarity), which interacts with a side surface of magnet 21 on an opposed side of the opening 5, which has a second polarity (e.g. south pole polarity), such that the two magnets achieve an attracting or magnetic pull force between them. This magnetic pull force is depicted in FIG. 9 through the use of opposite facing arrows. In the embodiment shown six magnets 21 are positioned along each segment 28 of the fastening mechanism 9. As noted above, each of the magnets may have a cylindrical shape. When the magnets 21 are diametrically magnetized, the side surfaces of the magnets have a selected polarity to attract an opposing magnet 21. This can provide for the magnets to have a small size to fit within a seam allowance of the main body and for the segments 29 to be in in side-by-side juxtaposition with each other.

In some embodiments, a first magnet 21 of the plurality of magnets is located along a first segment 28 of the fastening mechanism and has a side surface having a selected polarity, a second magnet 21 of the plurality of magnets is located along a second segment 28 of the fastening mechanism 9 and has a side surface having a selected polarity that is opposite the selected polarity of the side surface of the first magnet 21; and the first and second magnets 21 are each located at substantially similar positions along the segments of the fastening mechanism 9. In some embodiments, a third magnet 21 of the plurality of magnets is located along the first segment 28 of the fastening mechanism 9 spaced apart from the first magnet 21, the third magnet 21 having a side surface having a selected polarity similar to the selected polarity of the first magnet 21. In some embodiments, a third magnet 21 of the plurality of magnets is located along the first segment 28 of the fastening mechanism 9 spaced apart from the first magnet 21, the third magnet 21 having a side surface having a selected polarity opposite to the selected polarity of the first magnet 21. In some embodiments, the magnets are neodymium rare earth magnets that are diametrically magnetized.

In some embodiments, each of the plurality of magnets 21 are held in place along the edges of the opening 5 within a seam allowance. In some embodiments, the magnets 21 are floating (e.g. unadhered) within the seam allowance and can self-align (e.g. rotate) within the seam allowance to be magnetically attracted to an opposed magnet 21 of an opposed segment 28.

In some embodiments, each segment 28 of the fastening mechanism 9 also includes one or more fragments of a filler material 20. FIGS. 9, 10 and 11A-D show various embodiments of segments 28 of fastening mechanisms 9, or portions thereof that include filler material fragments 20. Filler material fragments 20 may be in the form of, but not be limited to, small rods, beads, particles or the like. The filler material fragments 20 may include but not be limited to plastic, rubber, latex, fabric, beads, sand or flexible metal material that may provide for the fastening mechanism 9, or portion thereof, to form a smooth, flexible shape around the bundle of hair H when the bundle of hair H passes through the closable opening 5. For instance, filler material fragments 20 may be made of a polymer, or of silicone, or a silicone-based polymer. Filler material fragments 20 may provide for the fastening mechanism 9 to be resilient (e.g. be bendable and/or be able to withstand shape deformation) and may provide for the flexible mechanism 9 to securely couple (e.g. fasten) around a bundle of hair H.

In at least one embodiment, the filler material fragments 20 may be evenly spaced along a length of the fastening mechanism 9. In other embodiments, the filler materials fragments 20 may be unevenly spaced along the length of the fastening mechanism 9. In some embodiments, such as in the embodiment shown in FIGS. 1-4, 8 and 11 as well as the embodiment shown in FIGS. 5-7, the filler material fragments 20 are interspersed between the magnets 21 along the length of the fastening mechanism 9. In some embodiments, the filler material fragments 20 may alternate with the magnets 21 along the length of the fastening mechanism 9 (see FIGS. 9 and 10).

In at least one embodiment, the filler material fragments 20 may be loose floating within the first seam allowance 18 and the second seam allowance 19 (e.g. be held in place by the seam allowance itself).

Figure 11A:
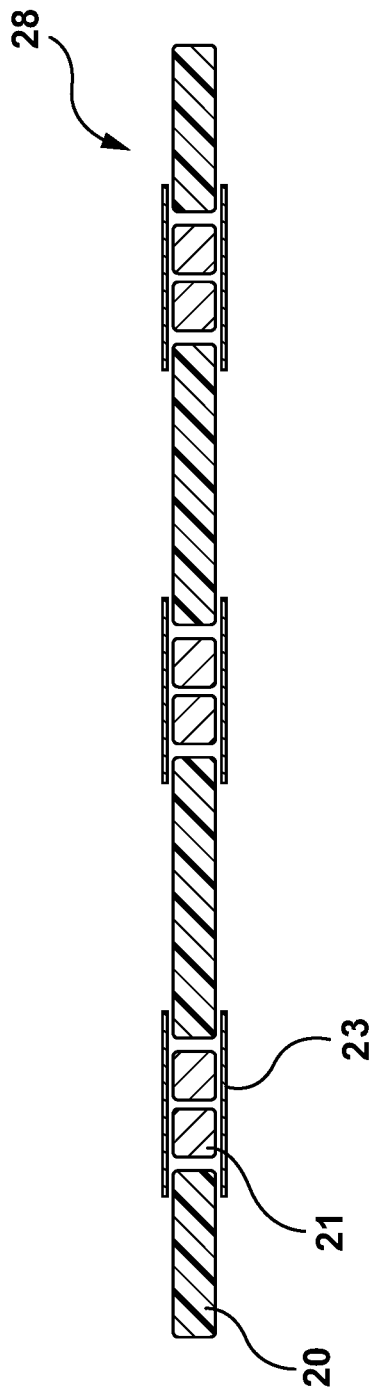
FIG. 11A shows a first embodiment of a segment of a fastening mechanism of a headwear article.
Figure 11B:
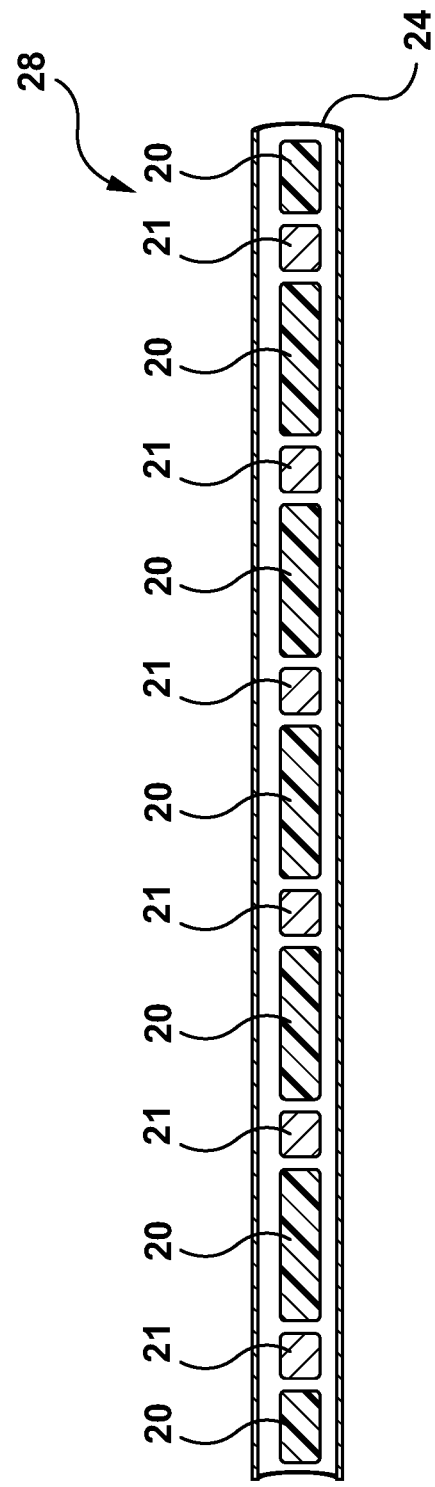
FIG. 11B shows a second embodiment of a segment of a fastening mechanism of a headwear article.
Figure 11C:
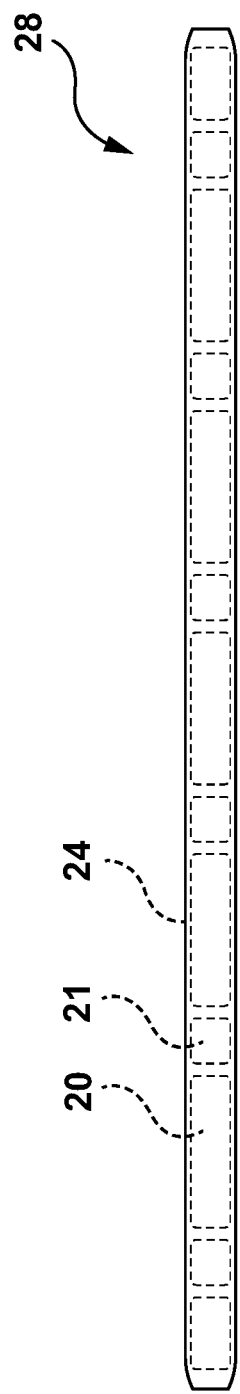
FIG. 11C shows a second embodiment of a segment of a fastening mechanism of a headwear article.

In at least one embodiment, the filler material fragments 20 and magnets 21 are positioned within the first seam allowance 18 and the second seam allowance 19 and are held together (e.g. coupled to each other), such as but not limited to by means of plastic injection molding, tape, glue or any other attachment method. In these embodiments, the filler material fragments 20 and magnets 21 form a segment 28 and at least one segment 28 is positioned within each of the first seam allowance 18 and the second seam allowance 19. Examples of segments 28 are shown in FIGS. 11A-C. Two segments 28 combine to form a fastening mechanism 9.

FIG. 11A shows one example of a segment 28 including cylinder-shaped magnets 21 coupled to tube-like filler material fragments 20. In this embodiment, the magnets 21 are coupled to filler material fragments 20 by an adhesive 23 (e.g. tape).

FIG. 11B shows one example of a segment 28 having a housing 24 containing a plurality of tube-like filler material fragments 20 and plurality of cylinder-shaped magnets 21. Housing 24 may be formed by heat shrinking a polymer (e.g. a silicone-based polymer) around the plurality of filler material fragments 20 and plurality of magnets 21 when the plurality of filler material fragments 20 and plurality of magnets 21 are aligned end-to-end. Housing 24 may be formed of the same material as the filler material fragments 20 or may be formed with a different material than filler material fragments 20.

FIG. 11C shows another embodiment of a segment 28 having a housing 24 containing a plurality of tube-like filler material fragments 20 and plurality of cylinder-shaped magnets 21 evenly dispersed from one another. In this embodiment, the housing 24 and the tube-like filler material fragments 20 are formed of the same material and integral with each other. In this embodiment, segment 28 can be formed, for example, by injection molding the material forming the housing 24 and the tube-like filler material fragments 20 around the evenly spaced apart magnets 21.

Figure 11D:
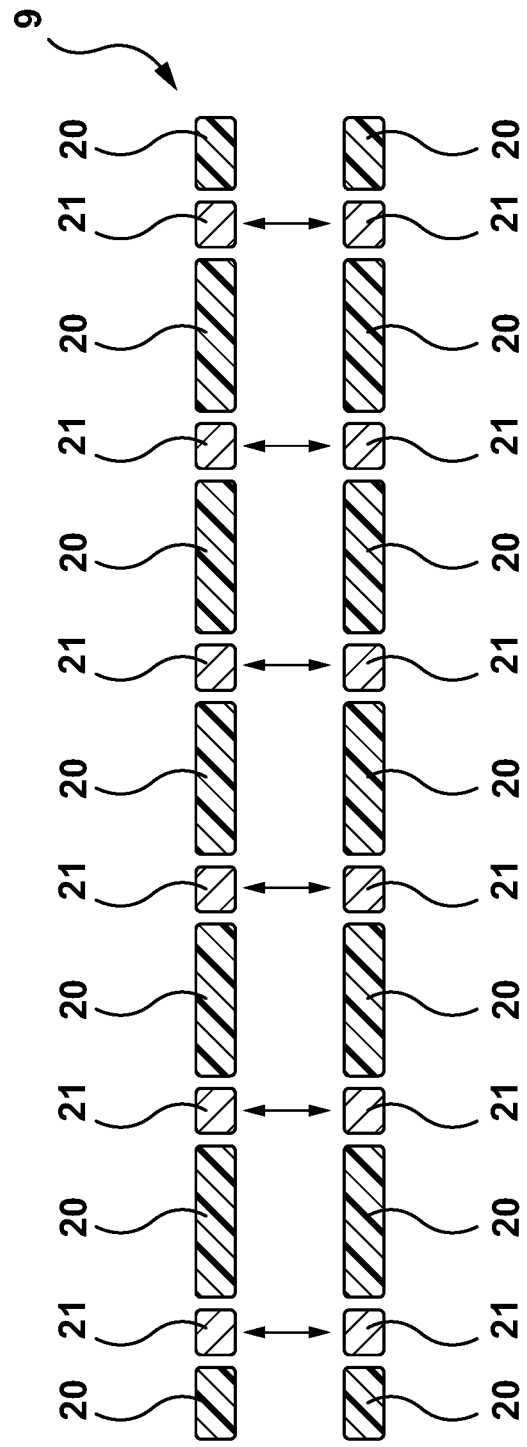
FIG. 11D shows a fastening mechanism of a headwear article, according to at least one embodiment described herein.

FIG. 11D shows a fastening mechanism 9 of a headwear article 1, according to at least one embodiment described herein. The arrows between respective pairs of magnets 21 indicate the magnetic force of attraction between the magnets that draws the segments 28 towards each other.

In at least one embodiment, the magnets 21 have a length in a range of about 0.1 cm to about 1.5 cm, or in a range of about 0.3 cm to about 1.0 cm, or have a length of about 0.6 cm.

In at least one embodiment, the filler material fragments 21 have a length in a range of about 0.5 cm to about 3 cm, or in a range of about 1.5 cm to about 2.5 cm, or have a length of about 2.2 cm.

In at least one embodiment, the opening has a width in a range of about 0.5 cm to about 10 cm, or in a range of about 1.5 cm to about 10 cm, or of about 10 cm when in the open configuration.

In at least one embodiment, the opening has a length in a range of about 5 cm to about 15 cm, or in a range of about 10 cm to about 15 cm, or of about 12 to about 15 cm or of about 13 to about 15 cm, or of about 14 to about 15 cm.

As noted above, fastening mechanism 9 is generally concealed within and/or forms a seam 15 of the headwear article 1. This configuration provides for a wearer W of the headwear article 1 to wear the headwear article 1 when the fastening mechanism 9 is in the closed orientation and conceal the fastening mechanism 9 (see, for example, FIG. 8). Further, the headwear article 1 provides a wearer with an option of using the closable opening 5 for hair passage, or leaving the closable opening 5 closed to provide for a lower position of hair. The optional closed orientation could also be used by those with short hair.

Figure 12:
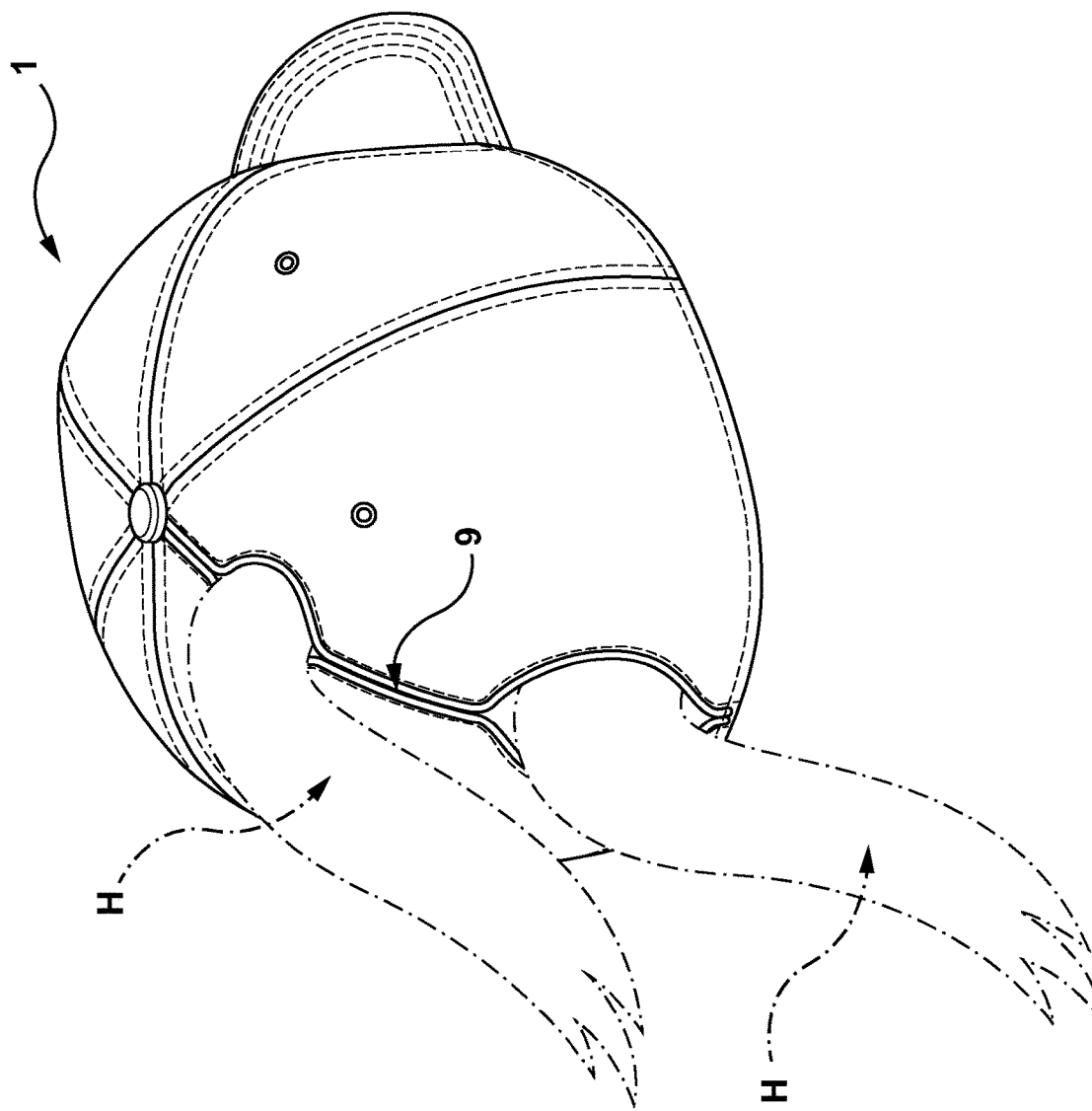
FIG. 12 shows a rear perspective view of the headwear article of FIG. 1 with the closable opening in the closed orientation and two bundles of hair passing therethrough.

Further, fastening mechanism 9 may provide for more than one bundle of hair H to pass through the closable opening 5 (see FIG. 12) and provide for the closable opening 5 to be closed between each bundle of hair to secure tight fit.

While the applicant's teachings described herein are in conjunction with various embodiments for illustrative purposes, it is not intended that the applicant's teachings be limited to such embodiments as the embodiments described herein are intended to be examples. On the contrary, the applicant's teachings described and illustrated herein encompass various alternatives, modifications, and equivalents, without departing from the embodiments described herein, the general scope of which is defined in the appended claims.

What is claimed is:

1. A headwear article comprising: a main body sized and shaped to receive at least a portion of a wearer's head, the main body comprising:
    a fastening mechanism having a first segment lining a first edge of a closable opening and a second segment lining a second edge of the closable opening, the first edge and the second edge being opposed to one another across the closable opening, each of the first segment and the second segment having:
        a housing;
        a plurality of magnets, each of the plurality of magnets being positioned within the housing and configured to attract an opposite magnet located along an opposing one of the first and second edges of the opening to selectively close at least a portion of the opening around a bundle of hair; and
        a plurality of tube-shaped fragments of a filler material, each of the tube-shaped fragments being positioned within the housing and in-between magnets of the plurality of magnets;
    wherein, when the fastening mechanism is in an open orientation, the first segment and the second segment are spaced apart from each another and, when the fastening mechanism is in a closed orientation, the first segment and the second segment abut each other to close the closable opening.

2. The headwear article of claim 1, wherein each of the first segment and the second segment of the fastening mechanism are concealed within the main body.

3. The headwear article of claim 1, wherein each of the housings is held in place within a seam allowance of the main body.

4. The headwear article of claim 1, wherein the plurality of magnets includes two pairs of corresponding magnets, one of the magnets of each pair of corresponding magnets being positioned on the first edge of the opening and a second one of the magnets of each pair of corresponding magnets being positioned on the second edge of the opening, each magnet of each pair of corresponding magnets being vertically aligned to reversibly couple the fastening mechanism and close at least a portion of the opening.

5. The headwear article of claim 1, wherein at least one of the plurality of magnets is cylindrical in shape.

6. The headwear article of claim 1, wherein at least one pair of magnets of the plurality of magnets is diametrically magnetized.

7. The headwear article of claim 1, wherein each of the plurality of magnets is diametrically magnetized.

8. The headwear article of claim 7, wherein
    a first magnet of the plurality of magnets is located along the first segment of the fastening mechanism and has a side surface having a selected polarity;
    a second magnet of the plurality of magnets is located along the second segment of the fastening mechanism and has a side surface having a selected polarity that is opposite the selected polarity of the side surface of the first magnet; and
    the first and second magnets are each located at substantially similar positions along the first and second segments of the fastening mechanism, respectively.

9. The headwear article of claim 8, wherein a third magnet of the plurality of magnets is located along the first segment of the fastening mechanism spaced apart from the first magnet, the third magnet having a side surface having a selected polarity similar to the selected polarity of the first magnet.

10. The headwear article of claim 1, wherein the filler material is a polymer-based filler material.

11. The headwear article of claim 1, wherein the first segment of the fastening mechanism is in side-by-side juxtaposition with the second segment of the fastening mechanism when at least a portion of the opening is closed.

12. The headwear article of claim 1, wherein the opening has a width of about 10 cm.

13. The headwear article of claim 1, wherein the opening extends from a top button of the main body to a bottom seam allowance of the main body.

14. The headwear article of claim 1, wherein each of the first segment and the second segment of the fastening mechanism includes six magnets.

15. The headwear article of claim 1, wherein each of the housings is held in place along the first and second edges of the opening within a seam allowance, respectively.

16. The headwear article of claim 1, wherein the plurality of magnets are unadhered to the fragments of filler material within the housing.

17. A headwear article comprising:
a main body sized and shaped to receive at least a portion of a wearer's head, the main body comprising:
a plurality of panels, each panel of the plurality of panels coupled to another panel of the plurality of panels along a seam; and
a fastening mechanism having a first segment lining a first edge of a closable opening and a second segment lining a second edge of the closable opening, each segment of the first segment and the second segment having:
a housing positioned within a seam allowance of a panel of the plurality of panels of the main body; and
a plurality of magnets, each of the plurality of magnets positioned within the housing and configured to attract an opposite magnet located along an opposite one of the first and second edges of the opening to selectively close at least a portion of opening around a bundle of hair; and
a plurality of tube-shaped fragments of a filler material, each of the tube-shaped fragments being positioned within the housing and in-between magnets of the plurality of magnets;
wherein, when the fastening mechanism is in an open orientation, the first segment and the second segment are spaced apart from each another and, when the fastening mechanism is in a closed orientation, the first segment and the second segment abut each other to close the closable opening.

18. The headwear article of claim 17, wherein the plurality of magnets are adhered to the fragments of filler material within the housing.

19. The headwear article of claim 1, wherein the plurality of magnets are unadhered to the fragments of filler material within the housing.

20. The headwear article of claim 17, wherein the plurality of magnets are adhered to the fragments of filler material within the housing.

* * * * *